United States Patent Office 3,053,452

Patented Sept. 11, 1962

3,053,452

ADDING/SUBTRACTING CIRCUITS FOR DIGITAL ELECTRONIC COMPUTERS

Tom Kilburn, Davyhulme, Manchester, and David Beverley George Edwards, Chorlton-cum-Hardy, Manchester, England, assignors to National Research Development Corporation, London, England, a British corporation Filed July 15, 1959, Ser. No. 827,342

Claims priority, application Great Britain July 18, 1958

8 Claims. (Cl. 235—175)

The present invention relates to adding/subtracting circuits for digital electronic computers and more particularly to adding/subtracting circuits for computers working in the parallel mode in the binary system. For the sake of simplicity the invention will be described in terms of adding circuits and addition but, as will be understood by those skilled in the art, the circuits involved can be used for subtraction by making the appropriate alternations in the logical functions, which determine the inputs to the various parts of the circuit.

In parallel operating computers the digits of the two numbers to be added are applied simultaneously to the adding circuits and it would be feasible to have available immediately the sum of the two numbers on parallel output wires were it not for the fact that it is necessary to take account of carry operations which may be generated at any position in the numbers being operated upon and which may have to be propagated from right to left, that is to say, from positions of less significance to positions of more significance in the number. In the worst possible case a carry may have to be propagated from the least significant place to the most significant place and this may involve say 40 transfers if 40 digit numbers are involved. The propagation of carry digits is normally effected by means of gate circuits including diodes, and a small delay takes place at each transfer of a carry digit from one stage to the next, because of the finite time it takes to establish a current in a non-conducting diode, be it a vacuum diode or a solid state device. Although the delay at each stage is extremely small, the propagation from stage to stage has to take place serially and the delays are therefore cumulative and can be significant. Indeed, they set a limitation on the speed of the adder. In order to accommodate the worst possible delay it may mean that the loss of time is greater than the delay itself, since in a synchronous machine it may be necessary to delay the next operation (say the reading out of the answer) until the next cycle in the rhythm of operation of the machine in order to preserve synchronism.

The present invention has for its object to reduce this delay.

It should be pointed out that the operation of addition is commonly involved as part of the process of multiplication and other arithmetical operations and it follows that addition accounts for by far the greatest number of arithmetical operations carried out by a machine. The elimination of delays, however small, in addition, therefore, can make a significant contribution to machine speed.

According to the invention, there is provided an adding/subtracting circuit for operation in the parallel mode on two binary numbers, comprising a carry signal line connecting said stages, a plurality of devices one in each stage and connected serially in said carry signal line, said devices having two operative states, namely, a non-conductive state in which a carry signal may not be propagated through said device and a conductive state in which a carry signal may be propagated therethrough with substantially no delay, and setting means connected to the device of each stage for predetermining the state of the corresponding device in response to input signals indicating the number digits applied to the associated stage.

At any given digit position in the addition of two numbers, a decision whether or not a carry digit must be allowed to pass or a new carry digit be initiated or no carry digit be passed on at all can be made by inspection of the digits to be added in accordance with the following table:

digit $x$=digit $y$=0:
  no carry digit to be passed on.
Digit $x \neq$digit $y$:
  carry digit from previous stage (if any) to be passed on.
Digit $x$=digit $y$=1:
  carry digit to be initiated.

In the first and third of these possible situations there is no propagation of a carry digit through the stage and a decision can therefore be taken to close the gate belonging to that stage in the carry digit chain. In the second situation the gate can be opened so that a carry digit will pass through if one is received from the previous stage. The situation which applies can be recognised immediately the numbers to be added have been fed to the adding circuit. In the first situation, of course, no delay due to the passing of a carry digit can possibly be involved and in the third situation again, no avoidable delay exists since the carry digit is initiated in that stage. In the second situation the gate is constituted by a transistor, and is opened by switching on the transistor, by such applied voltages as to make it bottom, that is to say make it conduct to saturation. The transistor then constitutes a conductive path virtually equivalent to an ordinary metal wire and there is therefore no delay in the propagation through it of a signal pulse from a previous stage.

The invention will be more clearly understood from the following description of some examples of addition circuits given with reference to the accompanying drawings in which.

The signal inputs marked on the drawings indicate that positive switching signals are present on the occurrence of the respective logical events as follows:

$x$ and $y$: when $x$ and $y$ are both present as "ones"
$x \neq y$: when $x$ is different from $y$
$\bar{x}$ or $\bar{y}$: when either $x$ or $y$ is "0"
$x = y$: when $x$ is the same as $y$ The suffixes indicate the stage to which the signal applies e.g., $x_0$ for the place of least significance, $x_1$ for the place of next higher significance and so on.

Figures 1, 2, 3:
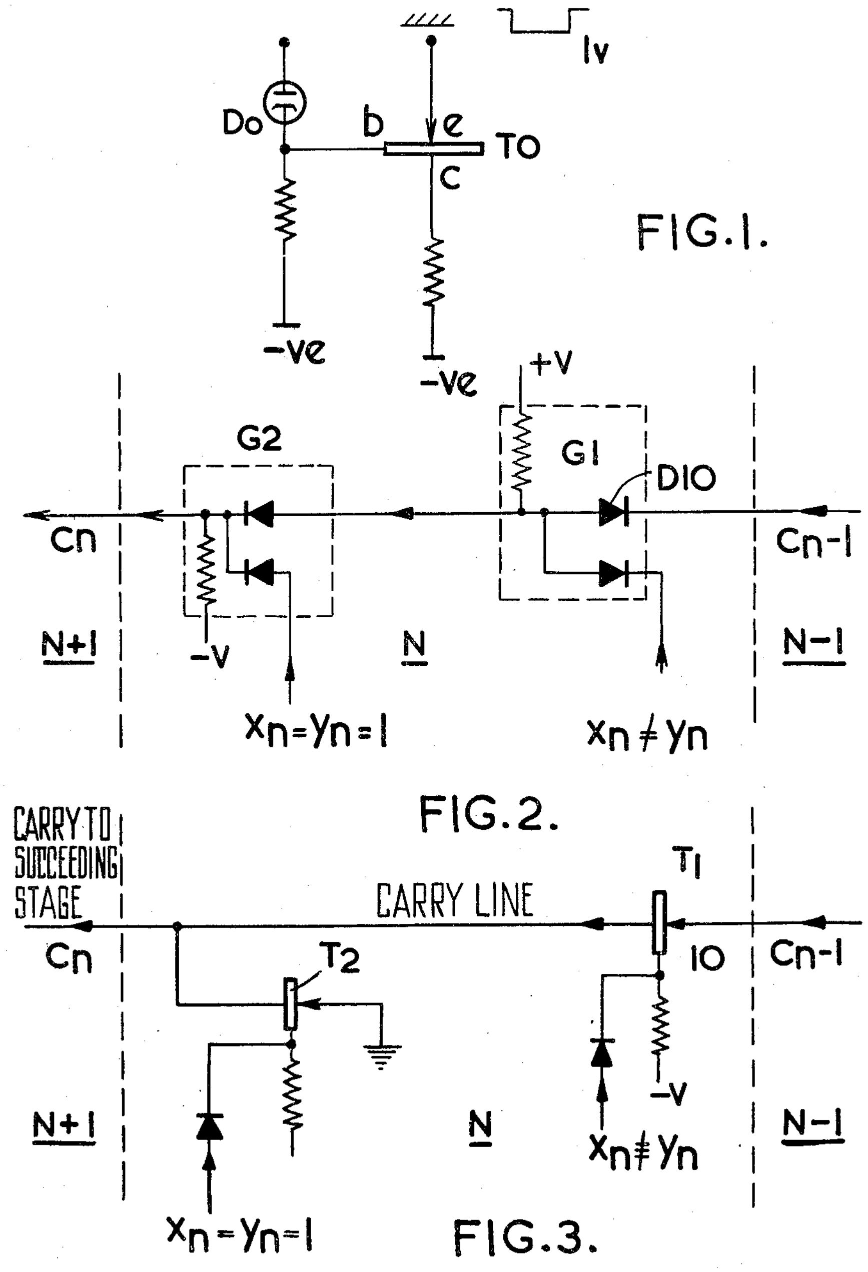
FIG. 1 is a diagram of a transistor gate circuit illustrating the basic principle employed in the invention.
FIG. 2 is a circuit diagram of a typical stage in the carry signal chain of a parallel adder employing diode gates.
FIG. 3 is a circuit diagram of an equivalent stage embodying the invention.

Referring first to FIG. 1, this shows a transistor T*o* having an emitter *e*, base *b* and collector *c*. Assume that the anode of diode D*o* is connected to a positive potential so that the diode conducts and the base potential is raised above that of the emitter and the transistor is switched off. If now the anode voltage of *Do* is lowered the base potential will drop until the transistor conducts and current will flow to the base and the collector. If the emitter is earthed as shown, and the negative voltages applied to the base and collector are sufficiently negative the transistor will saturate and its electrodes will be brought to a voltage slightly below earth. If now instead of being connected to earth the emitter voltage were lowered by a negative pulse all the electrodes would follow this negative excursion the current in the transistor remaining at saturation level, and the operation would not involve any delay since no change in the level of current flow through the transistor is involved. It follows that if a chain of transistors is connected in series, collector to emitter all down the chain in circuits of this type, and all the transistors are switched hard on, that is to say, made to pass saturation current, a negative pulse applied to the input emitter will be "felt" instantaneously all down the chain.

By analogy, a chain of thermionic valves could be employed connected cathode of one valve to anode of the next in series right down the chain and all the valves are made to conduct at saturation, then a negative going voltage pulse applied to the anode of the end valve will be "felt" instantaneously throughout the chain. It would not, however, be practically attractive to use thermionic valves in this way since it would be difficult to keep their internal impedances at a low enough value so that high voltage would be required to operate them and they would introduce undesirable inter-electrode capacities.

In order to appreciate how this action can be used to increase the speed of an addition circuit it is useful first to look at an adding circuit employing conventional diode gates. FIG. 2 shows two diode gate circuits G1 and G2 connected in the "carry" chain of an adder circuit of the kind to which this invention relates. Gate G1 controls the passage of carry pulses from the preceding stage, through the stage depicted, into the next stage and it is opened by a positive signal representing the condition $x_n \neq y_n$ (where $x_n$ and $y_n$ are the *n*th digits of the two numbers $x$ and $y$ to be added). This is the second of three situations which have been referred to above. Once the digits have been fed into the adder, it is known whether $x_n$ is or is not equal to $y_n$, the appropriate signal is set up in a part of the circuit not shown, and the gate G1 is therefore immediately opened if the inequality applies. If, now, a carry pulse $C_{n-1}$ is passed into this stage from a preceding stage, it is passed down the chain through gate G2 into the next stage, but the passage of the pulse is subject to a delay which may be of the order of, say, 25 milli-micro-seconds, due to the fact that it is required to switch off the diode D10 of gate G1.

The gate G2 is fed with a positive signal pulse in the case where $x_n = y_n = 1$, and this signal is fed on as a positive carry $C_n$ to the next stage. This is the third of the three situations described above. Obviously when $x_n = y_n = 0$, neither of the gates is opened and no carry is propagated to the next stage.

Of course, a delay of 25 milli-micro-seconds may not in itself be significant but supposing two 40-digit numbers are to be added, the cumulative delay in the worst possible case could amount to 40 times this 25 milli-micro-seconds, that is to say one micro-second, which is significant in relation to the rhythm of operation of the machine.

The corresponding circuit as modified according to the invention is shown in FIG. 3 where the two gates G1 and G2 of FIG. 1 take the form of transistors T1 and T2. Transistor T2 which replaces gate G2 merely routes a positive pulse $C_n$ to the carry line when fed with a negative signal corresponding to the logical function $x_n = y_n = 1$. Transistor T1 is triggered by a negative signal applied to its base when the condition $x_n \neq y_n$ applies, and this signal has the effect of making the transistor saturate. If now a carry pulse $C_{n-1}$ arrives over the line 10 from the preceding stage, it passes through the transistor T1 and down the carry line without being subject to any delay because the transistor is already conducting. It will be useful here to discuss the implications of this.

The transistor T1 may require a time for saturation current in it to be set up, which is longer than that which is required to operate a diode gate circuit of the kind shown in FIG. 2. However, when the transistor is saturated its electrodes are brought practically to the same potential as one another and a change in potential in any one electrode will be communicated to the other two as though all the electrodes were interconnected by fully conductive material such as copper. That is to say there is no delay between the change in voltage being applied to one electrode and its effect being felt on the others. Assuming therefore that the saturated state is set up during the first few milli-micro-seconds of a signal applied to the base, a carry signal on line 10 will be passed from the preceding stage to the following stage as though these two stages had been directly connected by wire. It thus follows that the propagation of a carry digit through a plurality of stages switched on in this manner will take no longer than the propagation of a carry digit from one stage to the next.

It would be reasonable to consider that the use of a transistor as an AND gate in an adder circuit of this kind would be undesirable compared with the use of a diode gate because of its longer switching time. However, the truth is that the longer switching time of the transistor is more than offset by the saving in time due to the more rapid propagation of the carry pulse. Assume that a carry pulse is to be propagated through, say, ten stages. The delay involved will not be more than the switching time of one transistor since all the ten transistors involved will be switched simultaneously and no propagation time over and above the switching time will be required. In the case of the diode gate however, each gate is rendered effective in turn as the carry pulse is passed on from each stage to the next and for this reason the delay in the propagation of the carry is cumulative over the total number of stages through which the carry is to be propagated. To see how this gain in performance arises, consider the operation of a diode gate in which the two diodes are normally both conducting. When one diode is switched off, the full saturation current flows through the other diode and the second pulse of the two functions required to operate the gate then has to switch off the diode. In other words the function of the gate to pass a signal necessarily involves a change in the conductive stage. In the case of the transistor AND gate used in the new circuit, however, the transistor is normally off, that is to say non-conducting. One only of the two function signals can switch it on so that the other function signal can be passed through it without the necessity of establishing any different conductive condition in the device. It should be noted that in order to derive the required benefit from these effects and to ensure proper functioning of the gate, the carry pulse must not arrive and fall to zero before the transistor has sufficiently switched on. The saturated condition must have been set up when the carry pulse arrives. If there is any danger that the carry pulse could die away before the transistor has time to establish full saturation current, it might be preferable to arrange that the carry signal is deliberately delayed. This can safely be done, knowing that the delay will not be augmented by propagation through a number of stages.

Figure 4:
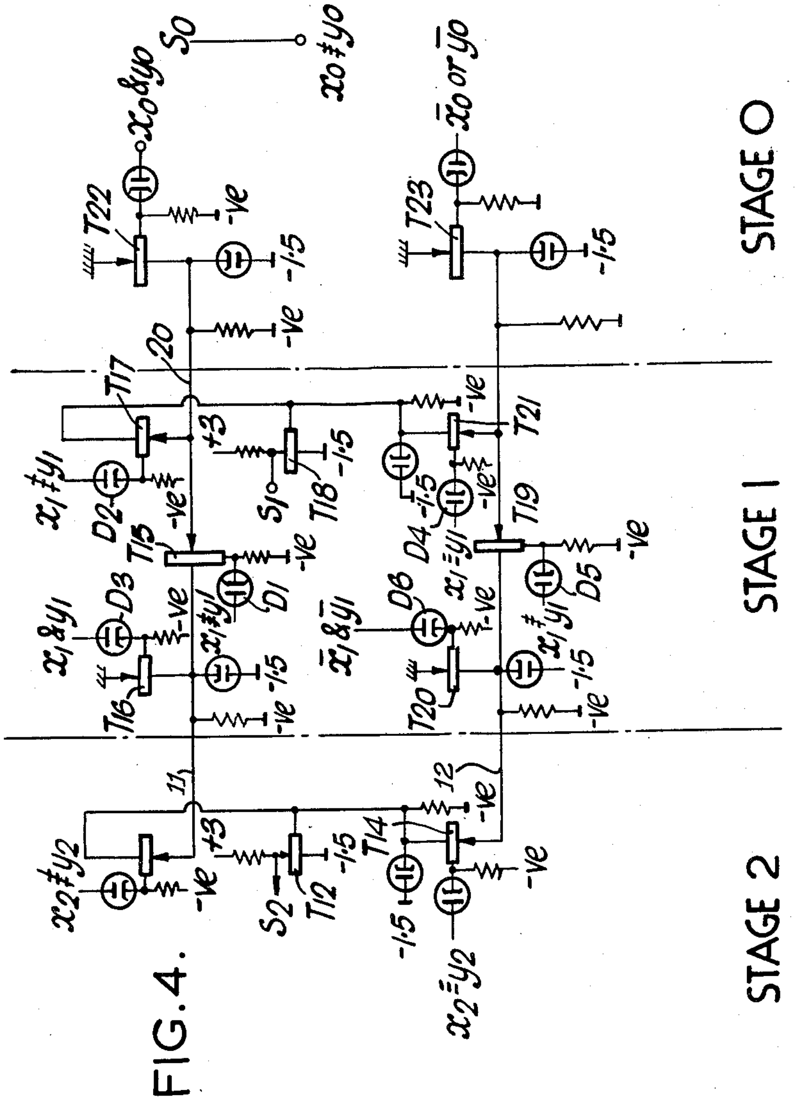
FIG. 4 is a circuit diagram showing three stages of an adding circuit according to the invention.

In FIG. 4 there is shown the diagram of a complete adder according to the invention. Only three stages are shown, but of course the centre section can be multiplied to suit the number of bits of which the numbers to be added are composed. The adder consists essentially of two lines, one of which may be called the carry line (11) and the other the inverse carry (hereinafter written $\overline{\text{carry}}$) line (12). Looking first at the centre or typical stage, the transistor T15 provides the gate by which a carry signal is propagated from right to left through the stage. It is controlled on its base by a signal representing the function $x_1 \neq y_1$ applied through the diode D1, the signal, if present, operating to switch on the transistor to saturation. If now a pulse is applied to its emitter over the wire 11 from the right hand stage, Stage 0, this will be passed straight through to the left hand stage, State 2. If the digits $x_1$ and $y_1$ are alike then the transistor T15 will not be switched on and no carry will be propagated past it from Stage 0. If the digits are not the same, a carry signal from Stage "0" will be routed to the sum output as described below but if they are both "1" the appropriate signal will be applied to diode D3 and a carry signal will be applied through transistor T16 to the carry line and passed on to Stage 2. The construction of the circuit associated with the $\overline{\text{carry}}$ line is exactly the same as that which has just been described for carry and signals signifying the inverse of the carry signal will be propagated through it or launched by it in the same way but subject to different controlling signals corresponding to the different logical relations which correspond to $\overline{\text{carry}}$. Thus, T19 is switched on by a signal representing $x_1 \neq y_1$ applied to D5 so that a $\overline{\text{carry}}$ signal will be propagated through the stage. T20 will launch a $\overline{\text{carry}}$ signal in response to a signal representing $\bar{x}_1$ and $\bar{y}_1$ applied to diode D6. A Sum output is given from terminal $S_1$ connected to transistor T18. The Sum output is related to the carry output for normal purposes in the following way:

If $x=y=0$,
  Sum=carry.
If $x \neq y$,
  Sum=$\overline{\text{carry}}$.
If $x=y=1$,
  Sum=carry.

However, in the present instance whereas the convention has been adopted for the input signals so that a "1" is negative compared to a "0," a carry "1" is in fact positive compared to a carry "0." Thus, to retain the same convention for the sum output signals the above Sum logic is reversed so that the Sum output is therefore derived from either the carry line or the $\overline{\text{carry}}$ line in the following way. If $x_1 \neq y_1$ a carry from the preceding stage (if any) will be routed to the Sum output through T17 which is switched by D2, fed with a signal $x_1 \neq y_1$. If $x_n = y_n = 1$ a $\overline{\text{carry}}$ from the previous stage (if any), will be passed to the sum output through T21 switched by diode D4 which receives a signal when $x_n = y_n$. No signal will be applied to the Sum output from the carry line in this case. If $x_1 = y_1 = 0$, again the Sum signal is derived from T21 triggered by D4.

The right hand, Stage 0, that is to say the stage handling the digit of least significance, omits of course transistor T15 and all to the right of it since it obviously cannot be required to pass a carry signal straight through. In this stage the Sum output is given directly by $x_0 \neq y_0$ since it cannot be affected by a carry. Similarly, the left hand stage, Stage 2 in the example, corresponding to the stage dealing with the digit of highest significance, omits the transistors corresponding to T15, T16, T19 and T20 since it cannot be required to deliver a carry digit to a higher stage.

Figures 5, 6, 7:
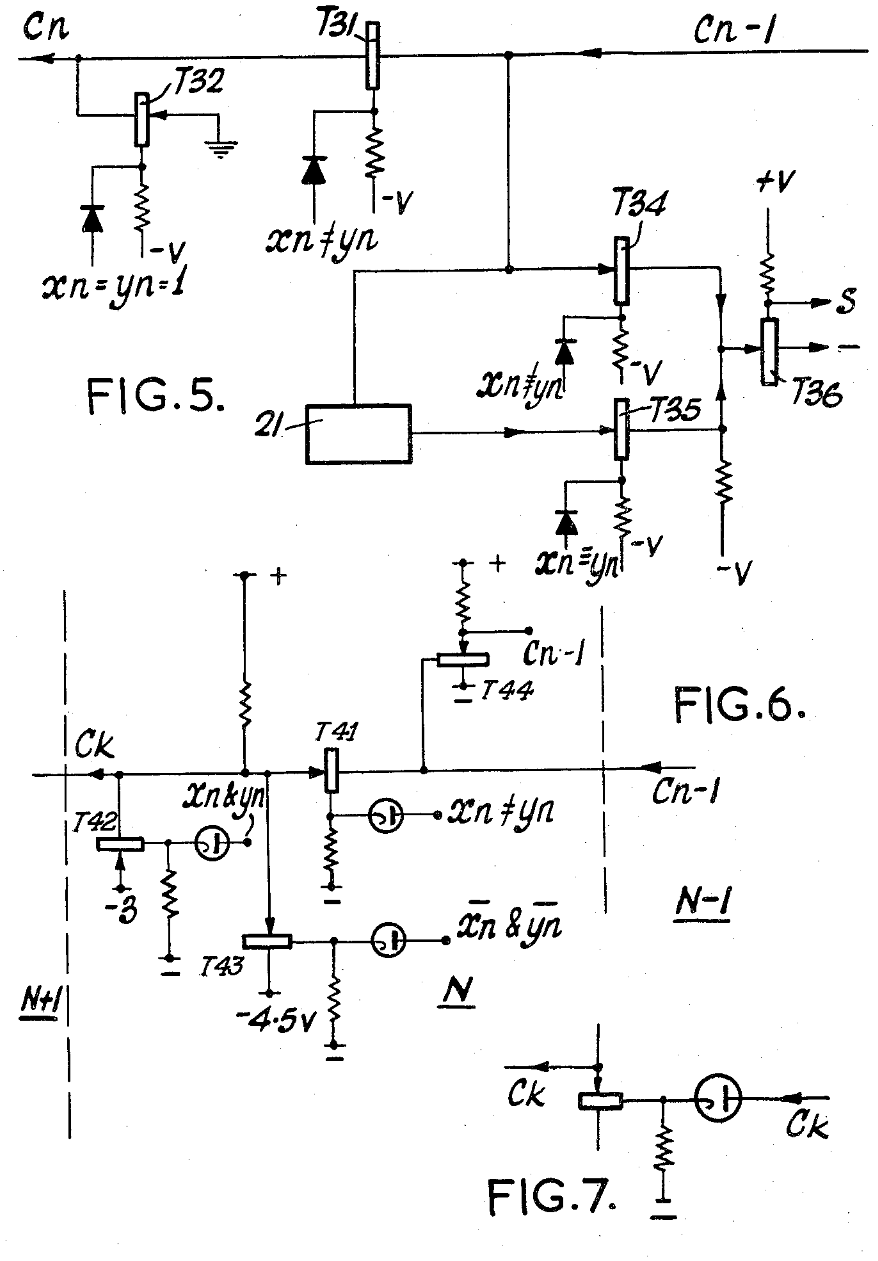
FIG. 5 is a single stage of a modified adding circuit according to the invention.
FIG. 6 is a single stage of a preferred adding circuit according to the invention.
FIG. 7 is a current gain circuit suitable for use in an adding circuit according to the invention.

FIG. 5 is an alternative circuit of a typical stage. In this circuit, transistors T31 and T32 are connected in the same manner as transistors T1 and T2 of FIG. 3. Transistors T34, T35 and T36 are connected to provide the Sum output on the basis of the presence or absence of a signal in the carry line in accordance with reverse logic as set out in the above table for the same reason as before. Thus the carry signal is passed through T34 and T36 to the Sum output, if T34 is switched on by the logical state $x_n \neq y_n$. If $x$ is not equal to $y$, then Sum=carry. If $x$ is equal to $y$ then Sum=$\overline{\text{carry}}$. In the latter circumstance T35 is switched on and passes to the Sum output the inverted carry signal from the inverter 21.

FIGURE 6 is a preferred circuit of one stage an adder according to the invention. This stage comprises transistors T41 and T42 as carry propagation gate and carry pulse generator and are operative in response to the same logical functions as transistors T31 and T32, respectively of FIGURE 5, and transistors T15 and T16, respectively, of FIGURE 4. However, in this case, the emitter and collector connections have been reversed for transistor T41 compared to the previous circuits. Also, the emitter of transistor T42 is connected to a —3 volts source in this instance, which is the carry voltage level.

A further transistor T43 is connected into the circuit in similar manner to T42 except that the emitter and collector connections are reversed, and the collector is connected to a —4.5 volts source, the no carry voltage level. This further transistor is operative in response to the logical function $x_n = y_n = 0$, that is, $\bar{x}_n$ and $\bar{y}_n$.

Another transistor T44 is included between the carry line and sum circuit input, as shown, to minimise the loading on the carry line.

It will be seen that only one of the transistors T41, T42 and T43 is operative for any combination of the input digits $x_n$ and $y_n$, and a leak resistor connected between the carry line and a positive voltage source provides a current for whichever transistor is operative. Thus, the required current for the operative transistor in each stage is provided in parallel to each stage and does not have to be provided along the carry line.

Furthermore, by making this current approximately equal to that which flows in the base circuit of T41 when saturated there is a small current through T43 in this state and consequently a very small D.C. drop.

In the normally inactive state, before addition is commenced, T42 is operative and T41 and T43 are off in each stage.

Thereafter the transistors in each stage may be changed directly from the existing states to the new states in response to the appropriate digital combinations applied for successive additions without returning to the above inactive state between each addition, except in so far as this may be the new stage state for one or more stages.

Means may also be included in each stage for limiting the amount of current which can be drawn through transistor T42 to avoid any undesirable effects if T42 of the $n$th stage should be operative and both transistors T41 and T43 of the $(n+1)$th stage be operative at the same time. A diode suitably connected to the emitter of T42 is quite adequate for this purpose.

It is found that there is some voltage drop along the carry line over a number of stages due to stray capacity effects and it is found preferable to include means for providing current gain after each group of an appropriate number of stages, say 5 or 6.

FIGURE 7 illustrates a circuit suitable for this purpose and is connected to the carry line with inputs and outputs as indicated. Thus, the consequential voltage drop arising from stray capacity effects may be compensated for in this manner.

The sum circuit arrangements for the example of FIGURE 6 are connected to the emitter of T44 and may be of either of the types described above, that is to say, use may be made of an inverse, or no carry line, and the sum signal appropriately derived from the carry or no carry line as the circumstances dictate, or an inverter may be connected in each stage and the sum signal appropriately derived from the carry line or from the inverter.

Although, in the above examples all of the transistors have their two operative states as the non-conductive state and the saturated state it is only necessary that the carry gate transistor signal (and no carry signal gate transistor) should be so operated. Thus, the other transistors used in the sum circuit and for carry signal and no carry signal generation may have their two operative states as the non-conductive and the normally conductive states. In this case, however, catching diodes would be associated with these transistors for operation when they are in the normally conductive state.

Also, although in the above arrangements the sum logic is reversed from the accepted sense in order to maintain the same convention for output signals as for input signals this need not be necessarily carried out. Clearly, the usual logic is preferably applied where the output signals are required in the convention adopted for the carry signals, that is, with a "1" positive with respect to a "0," and may also be applied where the output signal convention is of no importance as long as it is known, of course.

Other forms of adder circuit are of course possible. For example in one form of adder circuit commonly used the Sum is stored on a flip-flop suitably triggered by signals representing the logical functions $x \neq y$ and $x=y$, the appropriate trigger being additionally selected by the presence or absence of a carry signal. In such a circuit the carry signal can be fed into the circuit from the carry line through an emitter follower.

Finally, it should be emphasised that the invention is not limited to adding circuits properly so called but is equally applicable to the process of subtraction.

We claim:

1. An adding/subtracting circuit for operation in the parallel mode on two binary numbers comprising a plurality of stages one for each order of significance in said binary numbers, a carry signal line connecting said stages, a plurality of devices one in each stage other than the first and last connected serially in said carry signal line said devices having two operative states, namely a non-conductive state in which a carry signal may not be propagated through said device and a conductive state in which a carry signal may be propagated therethrough with substantially no delay, setting means connected to the device of each stage said setting means being responsive to inequality between the two number digits applied for addition to the associated stage whereby the device in the carry line in that stage is set to its conductive state in response only to the logical event $x \neq y$ and carry signal generating means in each stage except the last for launching a carry signal into the carry line beyond the device in the respective stage in the direction towards the stage of next higher significance in response to the logical event $x=y=1$ occurring in the number digits applied for addition to the respective stage.

2. An adding/subtracting circuit as claimed in claim 1 wherein each said device is a transistor.

3. An adding/subtracting circuit as claimed in claim 2 including Sum output means in each stage and setting means for said Sum output means connected to be controlled by signals in said carry signal line.

4. An adding/subtracting circuit as claimed in claim 3 wherein said setting means include signal inverting means for setting said Sum output means in accordance with the inverse of the signal in said carry signal line.

5. An adding/subtracting circuit as claimed in claim 4 including switch means operative to route the signals in said carry signal line to said Sum output means alternatively direct or through said inverting means in accordance with the appropriate logical events.

6. An adding/subtracting circuit for operation in the parallel mode on two binary numbers, comprising a plurality of stages one for each order of significance in said binary numbers, a carry signal line connecting said stages, a $\overline{\text{carry}}$ signal line connecting said stages, a plurality of devices one in each stage other than the first and last connected serially in said carry signal line, a plurality of devices one in each stage other than the first and last connected serially in said $\overline{\text{carry}}$ signal line all said devices having two operative states namely, a non-conductive state in which a signal may not be propagated therethrough and a conductive state in which a signal may be propagated therethrough with substantially no delay, setting means connected to the device of each stage the setting means for the devices in said carry signal line each being responsive to inequality between the two number digits applied for addition to the respective stage, the setting means for the devices in said $\overline{\text{carry}}$ signal line each being responsive to equality between the two number digits applied for addition to the respective stage, carry signal generating means in each stage except the last for launching a carry signal into said carry signal line in response to the logical event $x=y=1$ occurring in the number digits applied for addition to the respective stage and $\overline{\text{carry}}$ signal generating means in each stage except the last for launching a carry signal into said $\overline{\text{carry}}$ signal line in response to the logical event $x=y=0$ occurring in the number digits applied for addition to the respective stage, said carry and $\overline{\text{carry}}$ signal generating means being connected to said carry and $\overline{\text{carry}}$ signal lines beyond the respective devices in the direction of the stage of next higher significance.

7. An adding/subtracting circuit as claimed in claim 6 wherein each of said devices is a transistor.

8. An adding/subtracting circuit as claimed in claim 7 including in each stage except the first Sum output means and setting means for said Sum output said setting means being connected to be controlled alternatively by a signal in said carry signal line or a signal in said $\overline{\text{carry}}$ signal line in accordance with the logical significance of the number digits applied to the respective stage.

References Cited in the file of this patent

Richards I: Arithmetical Operations in Digital Computers, D. Van Nostrand Co., Inc., 1955 (pages 81, 82, 103 to 105 relied on).

Richards II: Digital Computer Components and Circuits, D. Van Nostrand Co., Inc., 1957 (pages 168 to 171 relied on).

Gilchrist et al.: Fast Carry Logic for Digital Computers, I.R.E. Transactions on Electrical Computers, volume EC–4, December 1955, No. 4, pages 133 to 136.